(12) United States Patent
Rosiewicz et al.

(10) Patent No.: US 7,309,175 B1
(45) Date of Patent: Dec. 18, 2007

(54) REDUCING HEATING FROM NON-COUPLED LIGHT IN POWER TRANSMITTING OPTICAL FIBERS

(75) Inventors: Alex Rosiewicz, Stow, MA (US); Ninghui Zhu, Winchester, MA (US); Michio Matsuki, Andover, MA (US)

(73) Assignee: EM4, Inc., Bedford, MA (US)

( * ) Notice: Subject to any disclaimer, the term of this patent is extended or adjusted under 35 U.S.C. 154(b) by 0 days.

(21) Appl. No.: 11/495,389

(22) Filed: Jul. 28, 2006

(51) Int. Cl.
*G02B 6/36* (2006.01)
*B65C 3/26* (2006.01)

(52) U.S. Cl. .................... 385/94; 385/92; 385/88; 385/80; 156/158

(58) Field of Classification Search ............ 385/88, 385/89, 92, 93, 94, 52, 76, 77, 78, 80; 65/385, 65/395, 406, 407; 156/158, 166
See application file for complete search history.

(56) References Cited

U.S. PATENT DOCUMENTS

| | | | |
|---|---|---|---|
| 5,727,105 A * | 3/1998 | Nagata et al. | 385/94 |
| 5,991,493 A * | 11/1999 | Dawes et al. | 385/141 |
| 6,400,857 B1 * | 6/2002 | Hatami-Hanza et al. | 385/14 |
| 6,757,464 B2 * | 6/2004 | Rubino, Jr. | 385/52 |
| 6,981,806 B2 * | 1/2006 | Benzoni et al. | 385/94 |

* cited by examiner

*Primary Examiner*—Brian M. Healy
(74) *Attorney, Agent, or Firm*—Wilmer, Cutler, Pickering, Hale and Dorr LLP

(57) ABSTRACT

Method and apparatus for mounting an optical fiber for coupling to a high power light source, the fiber being secured to its mount with a low refractive index adhesive. The low refractive index adhesive serves to reduce the coupling of light traveling within the fiber to the fiber mount, thereby reducing undesirable, potentially destructive heating in the fiber mount. The adhesive preferably comprises sol gel.

28 Claims, 2 Drawing Sheets

REDUCING HEATING FROM NON-COUPLED LIGHT IN POWER TRANSMITTING OPTICAL FIBERS

TECHNICAL FIELD

The inventions relate generally to the use of optical fibers for transmission of power, and more particularly to mounting optical fibers for coupling to light sources.

BACKGROUND

Optical fibers can be used to transmit power. To transmit along a fiber, electrical power is first converted into light with a power conversion device, such as a multimode pump chip. The high power light is directed into the fiber at a fiber tip, and then travels down the fiber to a destination, or is coupled into another fiber. To achieve optimal coupling at the fiber tip, the fiber tip is accurately aligned with the light source, and, once aligned, securely held in place. A typical securing technique involves stripping a 10-20 mm length of the jacket off the fiber at one end, metallizing the exposed glass of the fiber, inserting the fiber through a mounting tube, and securing the fiber to the mounting tube. The mounting tube is then secured to a mounting block.

High-powered optical fibers have been secured to a mounting tube with a metallic solder applied to the metallized surface of the fiber. When light traveling inside the fiber reaches the fiber wall, a significant portion of the light is deflected out into the metal. The deflected light is rapidly absorbed since the metallized surface of the fiber, as well as the solder, do not transmit light. Furthermore, the interface between the fiber and the solder contains a complex web of oxides and other dielectric materials that also absorb light. Modem multimode power-carrying optical fibers typically carry a total power of about 10 watts. Since about 10% of the fiber's power can be coupled to the metal layer and solder, this coupling can result in the deposition of about one watt within a few millimeters around the solder junction. Such energy deposition can cause intense localized heating, which can cause the solder to melt, and thus cause serious damage to the fiber and the surrounding components.

In one alternative approach, the metallic solder is replaced with glass solder or with epoxy. However, because these materials have a refractive index that is similar to that of glass or even a little higher, they refract light out of the fiber, also causing power loss. Oxides within the glass solder are efficient light absorbers, and the result can again be significant localized heating with potentially destructive consequences.

SUMMARY

The described embodiments reduce the coupling of power from a power-carrying fiber to its surroundings, particularly the mounting means. This reduction is achieved by securing the fiber with its polymer cladding stripped off to its mount with an adhesive that has a refractive index lower than that of the outer glass cladding of the fiber.

In general, in one aspect, the invention features a method of mounting an optical fiber for coupling to a light source. The method involves providing a portion of the fiber with its polymer cladding stripped off in a mounting tube, applying an adhesive having a refractive index lower than the refractive index of the fiber core and glass cladding to a junction between the fiber glass cladding and the mounting tube to secure the optical fiber to the mounting tube, and hermetically sealing the mounted fiber and the light source within a module housing.

Embodiments include one or more of the following aspects. The adhesive has a refractive index of less than 1.5; the adhesive may comprise sol gel, and may be transmissive of visible light; the adhesive further may have a curing time of less than 30 minutes at room temperature. The sol gel comprises 3-mercapptopropyl-trimethoxysilane and methyl-trimethoxysilane. The mounting tube is mounted such that the optical fiber is aligned with the light source. The mounting tube may be mounted on a mounting block connected to the module housing. The fiber core and cladding may comprise glass, in addition to a polymer outer cladding. Prior to placing the fiber inside the mounting tube, a tip portion of the fiber glass cladding may be exposed by stripping off the polymer cladding.

In general, in another aspect, the invention features an apparatus with a mounted optical fiber. The apparatus includes an optical fiber having a tip portion where the fiber with its polymer cladding stripped off is exposed; a mounting tube surrounding at least a portion of the tip portion of the optical fiber, the fiber being secured to the mounting tube with an adhesive having a refractive index lower than the refractive index of glass; and a light source that is optically coupled to the light source.

Embodiments include one or more of the following aspects. The fiber core is made of glass. The adhesive has a refractive index of less than 1.5; the adhesive curing time is less than 30 minutes at room temperature; the adhesive may be a sol gel adhesive; and the adhesive may be transmissive of light. The mounting tube is mounted so as to align the fiber with the light source. Other features and advantages will become apparent from the drawings and detailed description.

DETAILED DESCRIPTION

Figure 1:
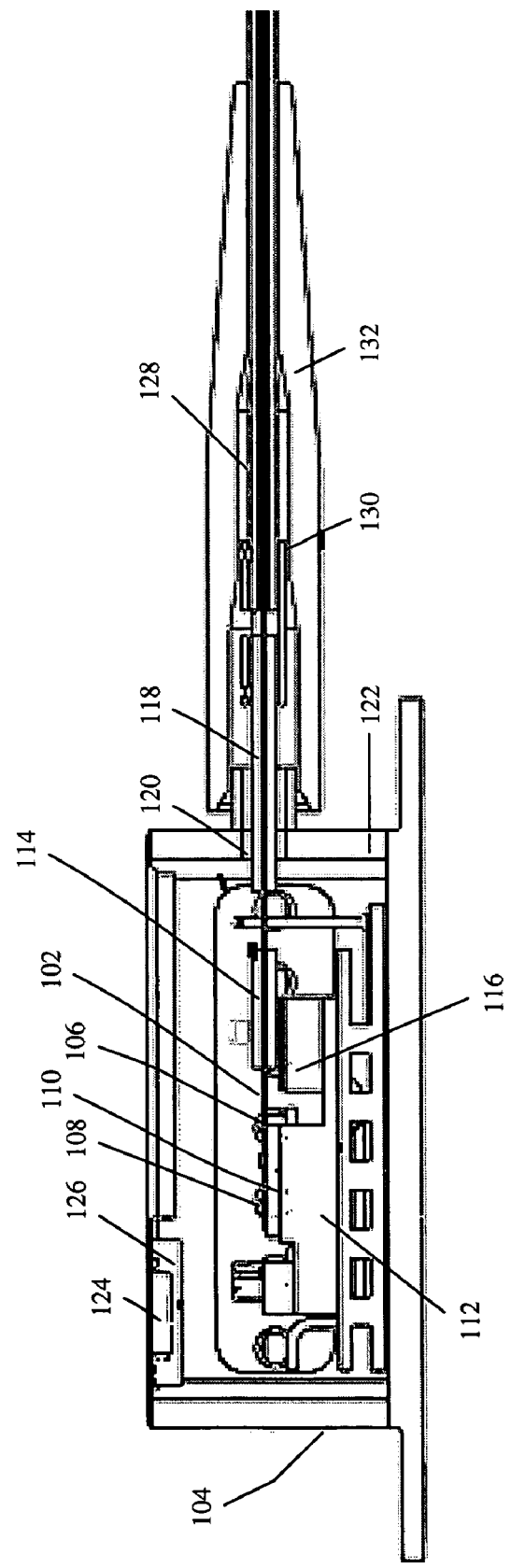
FIG. 1 is a side view of a high power multi-mode laser pump module assembly.

Multimode optical fibers typically transmit between one and 10 watts of power as light within an individual fiber, but power transmission may be as high as 100 watts per fiber. The power to be transmitted is normally provided to the fiber as an electrical current traveling along a conducting cable. A high power multimode pump chip converts the incoming electrical energy into optical energy in the form of laser light, which is coupled to an optical fiber. The multimode pump chip, the fiber tip (one end of the fiber), and associated components are all housed within a hermetically sealed module. One source of malfunction in the assemblies that couple electrical signals to optical fibers is leakage of non-coupled energy out of the core of the fiber into the cladding and into other material that is used to adhere the end of the fiber to its mount. Such energy leakage can cause intense localized heating with consequent damage to the fiber and its surrounding material, and can cause the system to fail, potentially catastrophically.

Energy is diverted from a glass fiber when a material surrounding the fiber has a refractive index equal to or higher than that of the fiber's glass, i.e., greater or equal to about 1.4. When glass solder is used to adhere the fiber to a mount, the adhering material has the same or higher refractive index as the fiber, which results in considerable coupling between the light incident on the inner fiber wall and the surrounding material. The degree of coupling may also be affected by the nature of the core-to-glass solder interface, which may have a layer of surface oxides.

The coupling of light to the surrounding material can be drastically reduced by using a material having a lower refractive index than that of the glass fiber. In this situation, light traveling along the fiber that impinges on the glass/surround boundary is incident from the higher-refractive index side of the junction. If incident at an angle greater than the critical angle (which is typically the case for light traveling along the fiber), the light is internally reflected back into the fiber. Low refractive index surrounding material thus reduces the coupling between the fiber and its surround.

The described embodiment uses a sol gel adhesive, referred to herein as sol gel 1612, to secure the optical fiber to the mounting tube. Sol gel 1612 is a colloidal suspension of silicon dioxide that is gelled to form a solid. It comprises 3-Mercapptopropyl-Trimethoxysilane (MPTMOS), Methyl-trimethoxysilane (MTMOS), and Ceramabind 644-A Colloidal Alumina Aqueous Solution.

The following is a typical mixing procedure and sequence.
1. Weigh 2.5 grams MTMOS into Trace-clean, $2^{nd}$ glass bottle using pipette.
2. Weigh 2.5 grams 644A to same bottle using second pipette.
3. Add 5 drops MPTMOS using third pipette.
4. Screw on lid.
5. Shake by hand for 5 minutes.
6. Allow to rest for 5 minutes.
7. Add 0.75 grams Acetone.
8. Shake bottle.
9. Label bottle contents, batch and mix date.
10. Use or refrigerate.

The sol gel is an effective adhesive, and serves to replace the metallic solder and/or the glass solder or epoxy adhesives used in other systems. The 1612 compound sol gel has a refractive index of 1.38 at a wavelength of 589 nm, significantly below the 1.5 refractive index of glass.

Sol gel is also optically transmissive, which means that any light that is coupled into it is not rapidly absorbed and does not cause localized heating. In contrast, the glass used in glass solder contains oxides that are efficient light absorbers that would cause power from coupled light to be deposited close to the contact surface with the fiber core. A further advantage of sol gel is that it is stable at room temperature, having a long shelf life. It also cures relatively rapidly (15 to 30 minutes) at room temperature. This property enables the assembly process to proceed rapidly. It also removes the need for the high temperatures required to melt and apply solder adhesives. This allows the assembly to be fixed while on the assembly station, avoiding possible internal movements within the assembly during removal from the assembly station. The low-temperature cure also beneficially avoids temperatures that could cause other solders in the module to soften or move, which could result in thermal damage to the polymer cladding of the fiber.

In another embodiment, the fiber is adhered to the mount with an adhesive having a refractive index of less than 1.5; in another embodiment, the adhesive has a refractive index of less than 1.45; in yet another embodiment, the adhesive has a refractive index of less than 1.4.

FIG. 1 is an illustration of a high power, hermetically sealed, multimode pump module that incorporates a sol gel adhesive, and that is used to couple optical power into a fiber. Fiber 102 is mounted inside module 104 with fiber tip 106 aligned with multimode pump chip 108 and its carrier 110. Carrier 110 is mounted on submount 112. Fiber 102 is mounted and secured by ferrule 114, which serves as a mounting tube, and is mounted on mounting block 116. Fiber 102 is adhered to ferrule 114 using a sol gel (not shown in FIG. 1). The fiber then passes through second ferrule 118 that exits sealed module 104 through package ferrule 120. First ferrule 114 and second ferrule 118 preferably comprise metals or metal alloys. Package ferrule 120 is soldered to wall 122 of module 104, and forms a hermetic seal with wall 122. Fiber 102 is hermetically sealed to second ferrule 118 with a glass solder. The purpose of first ferrule 114 is to secure fiber 102 in correct alignment with multimode pump chip 108, while second ferrule 118 surrounds the fiber with a hermetic seal before it exits sealed module 104. Sealed module 104 includes enclosure 124 containing a gettering material (not shown), which removes impurities from within module 104 through porous housing 126.

Outside sealed module 104, fiber 102 exits second ferrule 118 and, after a short gap, is covered with acrylate fiber jacket 128. The acrylate jacket is a covering that is normally supplied with the optical fiber, but here, the jacket has been stripped off to expose the glass core of fiber 102 to a distance of 18±0.5 mm from fiber tip 106. Second ferrule 118 is secured to jacket 128 with notched tube 130, providing strain relief for the fiber gap between second ferrule 118 and jacket 128. The entire assembly from package ferrule 120 to jacket 128 and beyond is covered with protective rubber strain relief boot 132, preferably comprising flame-retardant rubber.

Figure 2:
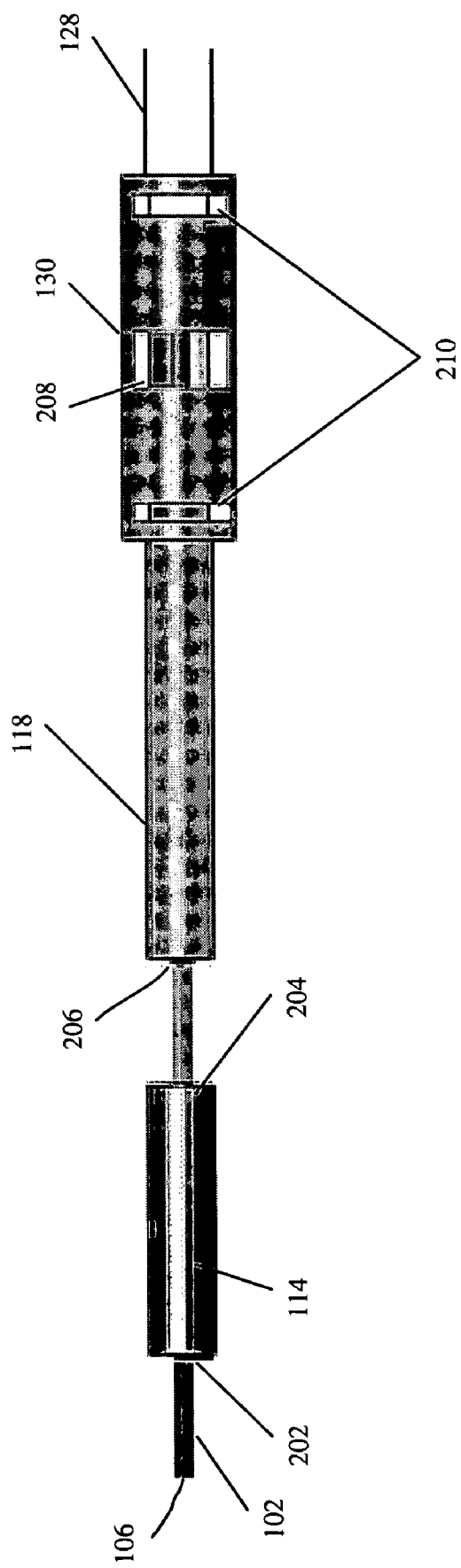
FIG. 2 is an illustration of selected components used to secure a high power optical fiber.

FIG. 2 is an illustration showing the fiber assembly in more detail. The figure shows the portion of fiber 102 from tip 106 extending about 18 mm along the fiber, corresponding to the portion for which fiber 102 has been stripped down to the glass core. At a distance of 1-4 mm, and preferably at about 2 mm, from fiber tip 106, the fiber enters first ferrule 114. The fiber is secured to ferrule 114 by sol gel 202, which serves as a low refractive index, highly transmissive adhesive layer. Sol gel 202 is applied to the first ferrule 114 and, through capillary action, wicks along fiber 102, reaching approximately 80-100% along the length of ferrule 114. Fiber 102 exits from back face 204 of ferrule 114, and after a short gap of approximately 2 mm, enters second ferrule 118, where it is secured with a hermetic seal provided by glass solder 206. Fiber 102 then exits second ferrule 118, and, after short gap 208, enters jacket 128. Strain relief is provided by notched tube 130, which is secured by epoxy joints 210 to second ferrule 118 at one end and to fiber jacket 128 at the other.

Glass solder is used to secure fiber 102 to second ferrule 118 in order to provide a hermetic seal. This joint allows light to leak from the glass cladding into the glass solder adhesive, which causes heating around the hermetic seal. This heating can be tolerated for low power parts in the 10 W range since the heat can be dissipated in the seal vicinity without destabilizing the fiber coupling or compromising the hermetic seal. However, when used with high power modules, such light leakage could cause destructive heating. In such applications it would be desirable to use a low refractive index adhesive, such as sol gel, to provide the required hermetic seal at this joint (as for first ferrule 114) without the light leakage and resulting heat dissipation associated with a glass solder joint.

Typical applications of optical fibers transmitting high power multimode laser light include ordnance initiation, soldering, photodynamic therapy, and marking. The laser light may also be used to provide pump power to other lasers, such as to diode-pumped solid state lasers, or to fiber lasers. Since the packages are fully hermetic, they can be used in challenging environments, such as underwater or in space.

Other embodiments are within the following claims.

The invention claimed is:

1. A method of mounting an optical fiber for coupling to a light source, the optical fiber having a fiber core and glass cladding that surrounds the fiber core, the method comprising:
    providing a portion of the fiber core and glass cladding in a mounting tube;
    applying an adhesive having a refractive index lower than the refractive index of the glass cladding to a junction between the glass cladding and the mounting tube to secure the optical fiber to the mounting tube; and
    sealing the mounted fiber and the light source within a module housing.

2. The method of claim 1, wherein the adhesive has a refractive index of less than 1.5.

3. The method of claim 1, wherein the adhesive has a refractive index of less than 1.45.

4. The method of claim 1, wherein the adhesive has a refractive index of less than 1.4.

5. The method of claim 1, wherein the mounted fiber and light source is hermetically sealed within the module housing.

6. The method of claim 1, wherein the adhesive cures in less than 30 minutes at room temperature.

7. The method of claim 1, wherein the adhesive comprises sol gel.

8. The method of claim 7, wherein the sol gel comprises sol gel 1612.

9. The method of claim 7, wherein the sol gel comprises 3-mercapptopropyl-trimethoxysilane and methyltrimethoxysilane.

10. The method of claim 1, further comprising mounting the mounting tube such that the optical fiber is aligned with the light source.

11. The method of claim 1, further comprising mounting the mounting tube on a mounting block connected to the module housing.

12. The method of claim 1, wherein the fiber core comprises glass.

13. The method of claim 1, further comprising exposing a tip portion of the glass cladding.

14. A method of mounting an optical fiber for coupling to a light source, the optical fiber having a fiber core and a glass cladding that surrounds the fiber core, the method comprising:
    providing a portion of the fiber core and glass cladding in a mounting tube;
    applying a sol gel adhesive to a junction between the glass cladding and the mounting tube to secure the optical fiber to the mounting tube; and
    sealing the mounted fiber and the light source within a module housing.

15. The method of claim 14, further comprising exposing a tip portion of the glass cladding.

16. The method of claim 14, wherein the mounted fiber and light source is hermetically sealed within the module housing.

17. An apparatus comprising:
    an optical fiber having a tip portion wherein a glass cladding of the fiber is exposed;
    a mounting tube surrounding at least a portion of the tip portion of the optical fiber, wherein the fiber is secured to the mounting tube with an adhesive having a refractive index lower than the refractive index of the glass cladding; and
    a light source, wherein the fiber is optically coupled to the light source.

18. The apparatus of claim 17, wherein the adhesive has a refractive index of less than 1.5.

19. The apparatus of claim 17, wherein the adhesive has a refractive index of less than 1.45.

20. The apparatus of claim 17, wherein the adhesive has a refractive index of less than 1.40.

21. The apparatus of claim 17, wherein the adhesive has a curing time of less than 30 minutes at room temperature.

22. The apparatus of claim 17, wherein the adhesive comprises sol gel.

23. The apparatus of claim 22, wherein the sol gel comprises sol gel 1612.

24. The apparatus of claim 22, wherein the sol gel comprises 3-mercapptopropyl-trimethoxysilane and methyltrimethoxysilane.

25. The apparatus of claim 17, wherein the adhesive is transmissive of visible light.

26. An apparatus comprising:
    an optical fiber having a tip portion wherein a glass cladding of the fiber is exposed;
    a mounting tube surrounding at least a portion of the tip portion of the optical fiber, wherein the fiber is secured to the mounting tube with a sol gel adhesive; and
    a light source, wherein the fiber is optically coupled to the light source.

27. The method of claim 1, wherein the adhesive comprises sol gel and the method further comprises mounting the mounting tube such that the optical fiber is aligned with the light source.

28. The apparatus of claim 17, wherein the adhesive is sol gel and the mounting tube is aligned with the light source.

* * * * *